March 17, 1931. P. P. BASTERREIX 1,796,553
ELECTRIC CONNECTER
Filed April 6, 1928 2 Sheets-Sheet 1
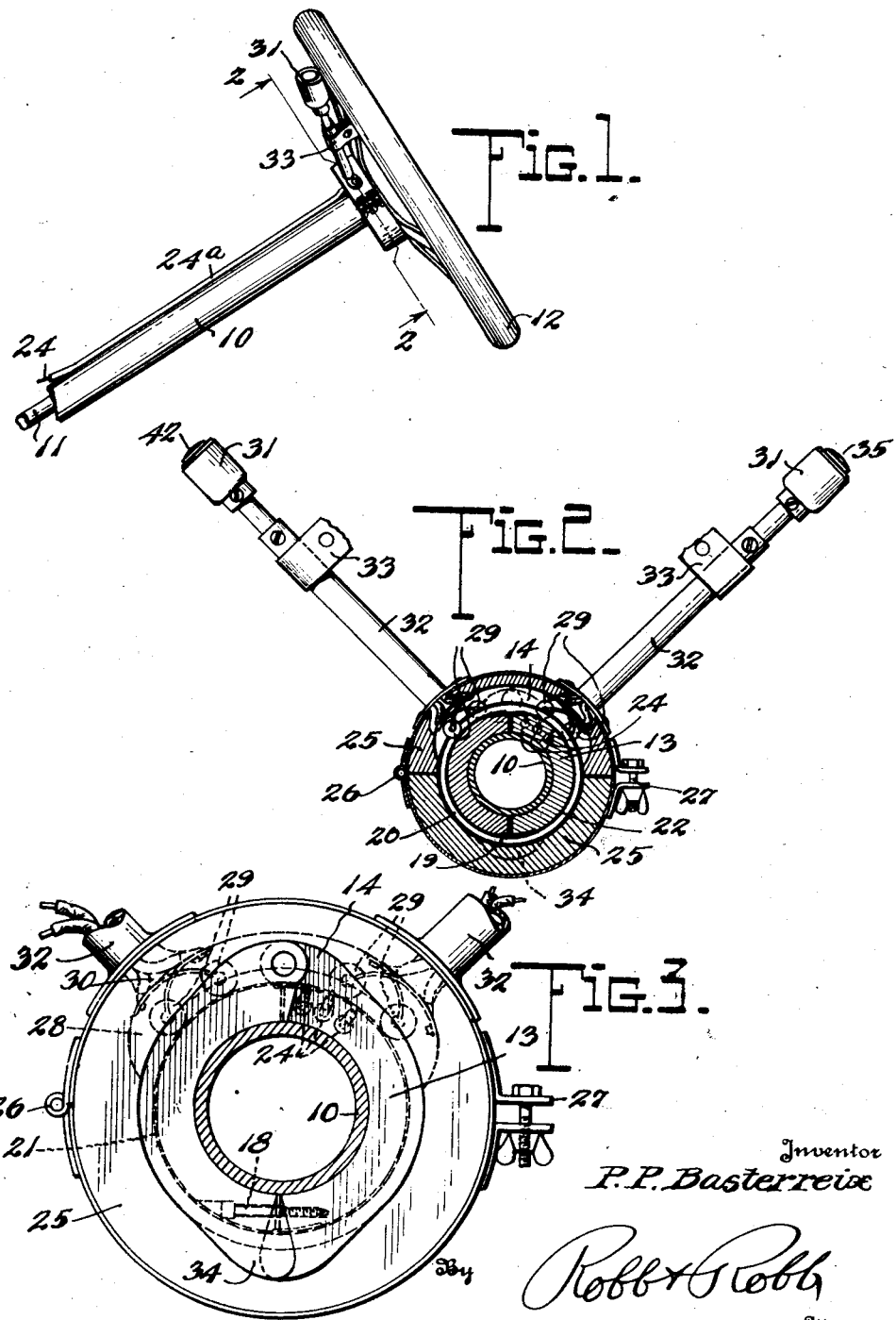

March 17, 1931.　　P. P. BASTERREIX　　1,796,553
ELECTRIC CONNECTER
Filed April 6, 1928　　2 Sheets-Sheet 2
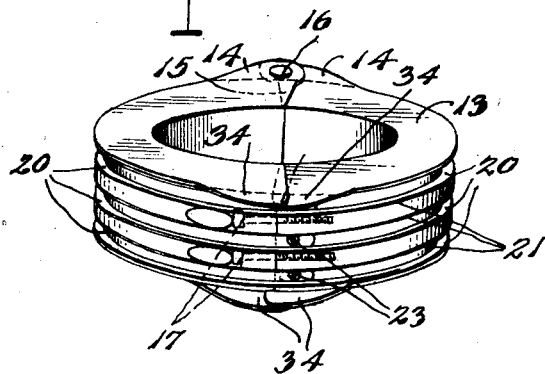
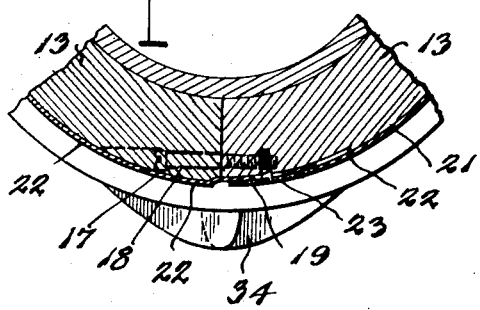
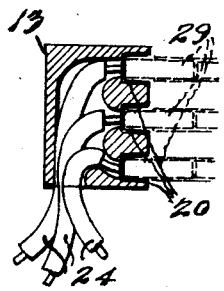
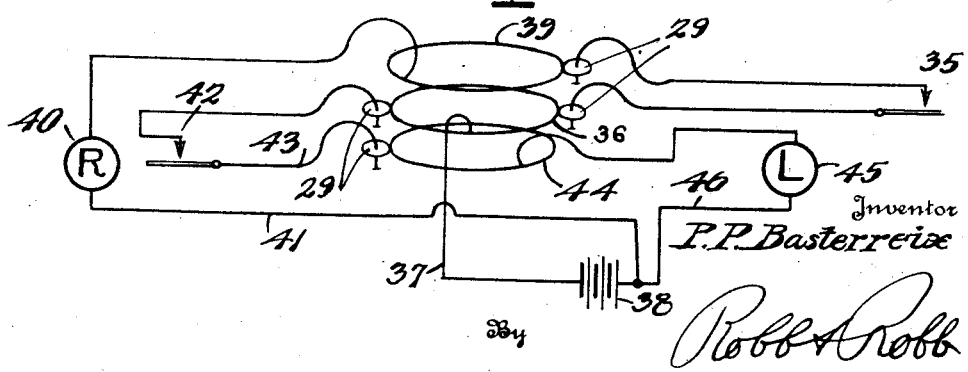
Inventor
P. P. Basterreix
By Robb & Robb
Attorneys Patented Mar. 17, 1931

1,796,553

UNITED STATES PATENT OFFICE

PIERRE PAUL BASTERREIX, OF BUTTE, MONTANA

ELECTRIC CONNECTER

Application filed April 6, 1928. Serial No. 267,956.

This invention relates to an electric connecter and particularly to a construction adapted for application to the steering wheel of a vehicle or other similar rotating member. The invention comprises an improvement upon the construction shown in my patent for Steering wheel switch, dated November 30, 1926, No. 1,609,104, by providing a rotatable contact between the fixed steering post and the shaft carrying the steering wheel so as to remove the tension and constant flexing of the circuit connecters extending from the wheel to the steering post.

In providing such a contact it is very desirable to avoid the necessity for removing the wheel from its shaft for the application of the contact device as such operation is often difficult and requires the use of a wheel puller. This invention provides a structure adapted for the application of a contact block to the steering post and a cooperating collar rotatable with the steering shaft without disassembling the wheel therefrom. Such a structure includes the formation of the block and sleeve in separable parts adapted to be opened for application and to be secured in closed relation with each other.

In constructions where the circuit closer is carried by a conductor tube mounted upon the spokes of a steering wheel, as in my prior patent, this tube is mounted upon the sleeve and extends laterally therefrom with means for attaching it to the spokes of the steering wheel which permits a shifting of the position of the tube and its circuit closer to the most convenient position on the wheel for the operator's use.

This construction provides means by which the desired number of contact grooves may be provided upon the block in order that a plurality of tubes and circuit makers may be mounted upon a sleeve which is desirable when more than one signal device is carried upon the steering wheel, for instance in the case of opposite directional signals.

The invention has for an object to provide an improved construction of control switch including a contact block provided with a circumferential conductor and a sleeve rotatably mounted upon said block and carrying a circuit maker provided with contact devices traversing said conductor upon the block.

A further object of the invention is to provide a construction in which the rotatable sleeve cooperating the contact block is provided with a radially disposed conductor tube carrying a circuit maker and adapted to be connected in adjusted relation to the steering wheel.

A further object of the invention is to provide a new construction of contact block and sleeve formed in separable sections adapted to be inserted upon relatively fixed and movable members and to be secured in rotatable relation to each other, together with a circuit maker having conducting members adapted to traverse a plurality of conductors upon the block.

Other and further objects and advantages of the invention are hereinafter set forth and the novel features thereof defined by the appended claims.

In the drawings:

Fig. 1 is an elevation of the application of the invention;

Fig. 2 is a section on line 2—2 of Fig. 1;

Fig. 3 is a top plan of the block and sleeve;

Fig. 4 is a detailed perspective of the conductor block;

Fig. 5 is a detailed section of the clamping means for said block;

Fig. 6 is a diagram showing the application of the invention with a plurality of circuit closers; and Fig. 7 is a detailed section through the block at the circuit connection.

Like numerals refer to like parts in the several figures of the drawings.

The numeral 10 designates the fixed steering post of a vehicle which is of the usual construction and surrounds the rotatable steering shaft 11 which carries at its upper end the wheel 12. The conductor block 13 is formed in separable sections pivotally connected at one side and provided with clamping means at the opposite side, and various devices may be used for this purpose. One means comprises the pivoting ears 14 extended radially from the block at each side of the joint 15 thereof and connected by a pivot 16, these members being duplicated at the upper and lower faces of the block.

A convenient device for securing the separable ends of the block and clamping the same against rotation upon the post 10 comprises the screws 17 extended through an aperture 18 in one section and threaded at 19 into the opposite section. The diameter of this aperture permits lateral movement of the sections in reaching their assembled relation. The periphery of the block is formed with a plurality of grooves 20, each of which is provided with a conducting face 21 and the body of the block may be of suitable non-conducting material. The faces are connected with independent conductors 24 extended through a tube 24a upon the steering post, see Figs. 1 and 7.

In order that these conductors 21 may suitably overlap, those upon one section are provided with a projected free end 22 which is secured by a fastening device 23 to the conducting surface of the other section thus providing a continuous circuit connection. The number of these grooves and conductors provided upon the block will vary according to the circuit makers to be located upon the steering wheel. In the present instance three grooves are shown for cooperation with two circuit makers, one of said grooves having a battery connection and the other two extending to signal devices, these parts being more fully disclosed in connection with the diagram in Fig. 6.

The conductor block is surrounded by a sleeve 25 composed of opposite sections pivotally connected at 26 and secured in position upon the block by a clamping device as shown at 27. This sleeve is adjusted upon the block so as to be freely rotatable and is formed with a recess 28 within which contact rollers 29 are mounted to traverse the conductors 21 within the grooves of the block. From these rollers proper wiring 30 extends to the contact maker 31, which in the present instance comprises a push button carried at the outer end of the conductor tube 32 adapted to be supported upon a spoke of the steering wheel by a clamp 33 substantially as shown in my patent before mentioned.

This tube is rigidly mounted upon the sleeve 25 and extends radially therefrom so that by a proper rotation of the sleeve upon the contact block the tube may be disposed in the desired circumferential relation to the handhold of the steering wheel. The tubes and the conductors extending therefrom may be duplicated to the desired extent upon this sleeve and are similar in construction so that only one has been described.

It will be observed that when the sleeve embraces the block and the latter is clamped to the steering post, the pivoting ears upon the block will overlap the upper and lower faces of the sleeve and thus prevent axial movement of the sleeve upon the block.

For this purpose the block may also be provided with an overlapping plate 34 at its joint opposite the pivot, such plate being duplicated upon the upper and lower faces of the block to confine the sleeve. If the invention be used with a single tube and circuit maker only two grooves are required upon the contact block, but when two circuit makers are used as herein shown three grooves are used upon the block and the circuit arrangement for thus controlling two separate signals, as illustrated in Fig. 6, wherein the circuit maker 35 when closed forms one side of the circuit through a block conductor at 36 which is connected by line 37 to a battery 38 while the opposite side of this circuit is connected to the conductor 39 through the signal 40 to the battery by line 41.

The circuit maker 42 is likewise connected with the battery connection 36 and 37 and by line 43 with the block conductor 44 in circuit with an independent signal 45 having a return battery connection 46.

Having described the invention the operation thereof will be apparent and it will be seen that the conductor block is adapted to be applied and secured to the steering post without removal of the steering wheel while the sleeve is supported upon this block and connected for a rotative movement by means of the conductor tubes carried by the spokes of the wheel and supporting the circuit makers. The construction is such that all of the circuit conducting parts are enclosed and protected while the block provides properly insulated conducting faces for the battery and several signal circuits. The circuit relation between the circuit makers is constantly maintained by the rollers which traverse and are guided by the grooves of the block carrying the conducting strips.

The invention is adapted to be applied to various forms of electrical connection where the circuit maker is carried by a rotating member and cooperates with a connection upon a relatively fixed part, while the structure is such as to provide for either a single or a plurality of signal operations directly controlled from the steering wheel of the vehicle.

The construction presented is simple, efficient and economically manufactured so that it may be readily applied without the services of a skilled workman.

While the specific details of construction have been shown and described, the invention is not confined thereto as changes and alterations may be made therein without departing from the spirit of the invention as defined by the following claims.

What I claim is:

1. In an electric connecter, a contact block provided with a circumferential conductor, a sleeve rotatably and supportingly mounted upon said block, and a circuit closer carried by said sleeve and having means contacting with said block.

2. In an electric connecter, a contact block provided with a circumferential conductor, a sleeve rotatably mounted upon said block, a circuit closer carried by said sleeve and having means contacting with said block, said block and sleeve being formed in separable sections, and means for detachably connecting said circuit closer to an actuating member to produce relative movement between the contact block and sleeve incident to shifting of said actuating member.

3. In an electric connecter, a contact block provided with a plurality of grooves having conducting faces, a sleeve rotatably mounted on and supported by said block and provided with contacts traversing said grooves, conductor tubes extended radially from said sleeve, and circuit closers carried by said tubes, said sleeve being rotatable by said tubes.

4. In an electric connecter, a contact block provided with a plurality of grooves having conducting faces, a sleeve rotatably mounted on said block and provided with contacts traversing said grooves, conductor tubes extending radially from said sleeve, circuit closers carried by said tubes, and means carried by said tubes for detachably securing the same to the spokes of a steering wheel.

5. In an electric connecter, a contact block formed in pivoted separable sections, means for clamping said sections in contact with a fixed part, conductors disposed upon the periphery of said block, a sleeve formed in pivoted separable sections carried by and adapted to enclose said block, means for securing said sleeve in rotatable relation to the block, and a circuit closer carried by said sleeve and having a contact engaging the conductor of the block.

6. In an electric connecter, a contact block formed in pivoted separable sections, means for clamping said sections in contact with a fixed part, conductors disposed upon the periphery of said block, a sleeve formed in pivoted separable sections and adapted to enclose said block, means for securing said sleeve in rotatable relation to the block, a circuit closer carried by said sleeve and having a contact engaging the conductor of the block, and means carried by the block for preventing movement of the sleeve axially thereof.

7. In an electric connecter, a contact block formed in pivoted separable sections, means for clamping said sections in contact with a fixed part, conductors disposed upon the periphery of said block, a sleeve formed in pivoted separable sections and adapted to enclose said block, means for securing said sleeve in rotatable relation to the block, a circuit closer carried by said sleeve and having a contact engaging the conductor of the block, and projecting lugs in the upper and lower faces of the block disposed to overlap said sleeve.

8. In an electric connecter, a contact block provided with a plurality of circumferential conductors, a battery connection extending from one of said conductors, a signal connection extending from another of said conductors, a sleeve carried by said block and rotatable with respect thereto, said sleeve having contacts separately traversing the conductors, and a circuit closer carried by the sleeve and controlling said contacts, said circuit closer being adapted to be detachably connected to a vehicle steering wheel for producing relative movement between the contact block and sleeve incident to movement of the said steering wheel.

In testimony whereof I affix my signature.

PIERRE PAUL BASTERREIX.